(12) United States Patent
Tsumura et al.

(10) Patent No.: US 10,417,223 B2
(45) Date of Patent: Sep. 17, 2019

(54) SYSTEM AND METHOD OF DATA WRANGLING

(71) Applicant: Business Objects Software Ltd., Dublin (IE)

(72) Inventors: Michael Tsumura, Richmond (CA); Ivailo Ivanov, Vancouver (CA); Viren Suresh Kumar, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 160 days.

(21) Appl. No.: 15/720,930

(22) Filed: Sep. 29, 2017

(65) Prior Publication Data
US 2018/0025051 A1    Jan. 25, 2018

Related U.S. Application Data

(63) Continuation of application No. 14/583,494, filed on Dec. 26, 2014, now Pat. No. 9,779,134.

(51) Int. Cl.
*G06F 3/0484* (2013.01)
*G06F 16/245* (2019.01)
*G06F 16/35* (2019.01)
*G06F 16/2458* (2019.01)

(52) U.S. Cl.
CPC ........ *G06F 16/245* (2019.01); *G06F 3/04847* (2013.01); *G06F 16/2462* (2019.01); *G06F 16/35* (2019.01)

(58) Field of Classification Search
CPC .................................................. G06F 3/04847
USPC .......................................................... 715/771
See application file for complete search history.

(56) References Cited

U.S. PATENT DOCUMENTS

| | | | |
|---|---|---|---|
| 8,751,499 | B1 | 6/2014 | Carasso et al. |
| 9,032,314 | B2 | 5/2015 | Mital et al. |
| 9,483,162 | B2 | 11/2016 | Mingione |
| 9,563,674 | B2 | 2/2017 | Hou et al. |
| 9,779,134 | B2 | 10/2017 | Tsumura |
| 2011/0055722 | A1 | 3/2011 | Ludwig |
| 2013/0268520 | A1 | 10/2013 | Fisher et al. |
| 2014/0189858 | A1 | 7/2014 | Chen et al. |

(Continued)

OTHER PUBLICATIONS

"U.S. Appl. No. 14/503,494, Response filed May 20, 2017 to Non Final Office Action dated Mar. 30, 2017", 13 pgs.

(Continued)

*Primary Examiner* — William D Titcomb
(74) *Attorney, Agent, or Firm* — Schwegman Lundberg & Woessner, P.A.

(57) ABSTRACT

In some example embodiments, a graphical user interface (GUI) is caused to be displayed on a computing device of a user. The GUI can be configured to enable the user to submit an identification of a dataset and at least one configuration parameter. The identification of the data source and the at least one configuration parameter can be received via the GUI on the computing device. A sampling algorithm can be configured based on the at least one configuration parameter. A sample of data from the dataset can be generated using the configured sampling algorithm. The time parameter can limit an execution time of the generating of the sample of data to within a maximum amount of time indicated by the user.

20 Claims, 9 Drawing Sheets

(56) References Cited

U.S. PATENT DOCUMENTS

| | | | |
|---|---|---|---|
| 2014/0278406 A1* | 9/2014 | Tsumura | G06Q 10/06 704/235 |
| 2014/0279803 A1* | 9/2014 | Burbank | G06N 5/02 706/47 |
| 2014/0280352 A1* | 9/2014 | Sam | G06F 16/86 707/793 |
| 2014/0359425 A1 | 12/2014 | Van Der Molen et al. | |
| 2015/0154269 A1 | 6/2015 | Miller et al. | |
| 2015/0234905 A1 | 8/2015 | Carasso et al. | |
| 2016/0188663 A1 | 6/2016 | Tsumura et al. | |

OTHER PUBLICATIONS

"U.S. Appl. No. 14/583,494, Non Final Office Action dated Mar. 30, 2017", 15 pgs.

"U.S. Appl. No. 14/583,494, Notice of Allowance dated Jun. 21, 2017", 9 pgs.

* cited by examiner

| Name | Type | Size | Perm. | Owner | Group |
|---|---|---|---|---|---|
| . | dir | | | | |
| /documents/employees/employees.csv | file | 7.431KB | 644 | viren | supergroup |

● Fetch First [20000] Rows
○ Fetch [   ] Random Rows
○ Fetch Max. [   ] Rows
○ Fetch [   ] % of Dataset
○ Fetch for [   ] Minutes

[Submit] [Cancel]

*FIG. 4*

Create Groups by Range from "ManagerID"

Create equally sized intervals

Dimension Name: ManagerID
Min Value: 1
Max Value: 45

New Dimension Name: [ManagerID Intervals]
Create: [5] Intervals
From: [1]
To: [45]
Group remaining values as: [Others]

[Display Formatting...] [Submit] [Cancel]

*FIG. 5*

SYSTEM AND METHOD OF DATA WRANGLING

CROSS-REFERENCE TO RELATED APPLICATIONS

This application is a continuation of prior application Ser. No. 14/583,494, filed on Dec. 26, 2014, which is incorporated by reference herein in its entirety.

TECHNICAL FIELD

The present application relates generally to the technical field of data processing, and, in various embodiments, to systems and methods of data wrangling.

BACKGROUND

Data Wrangling is the process of converting or mapping data from one raw form into another format so it is readily consumable for analytics, such as cleaning unstructured data to columnar format. For example, during data wrangling, the user may want to split a date time value into two separate columns, format the date in a specific way, or even remove the time portion of the value to save space. Another example of data wrangling is merging log file data with user metadata so that the background of the user who is executing the action can be understood.

On a large dataset on the scale of petabytes, there is a problem of how to create a smart representative sample of the dataset that will take into account the trade-offs between time and quality. It is important to create sample dataset that is a subset of the real dataset because it is not physically possible to store the entire data set on a single desktop machine. A self-service user ideally does not want to wait days for sample data set to be produced before beginning to create wrangling operations. It is important to get a quality representative set of sample data to perform operations on so that the user does not waste time with multiple iterations of the scheduled job. For example, if the user is only sampling the first file in a directory that represents log files from the first day of the month and this log file does not contain any logged errors, this could cause logic errors when creating the wrangling operations. The format of a logged error value would be unexpected and cause the wrong wrangled output to be generated.

There is also a problem with how to effectively communicate to the user that the wrangling operations and the visualizations are executed on sampled data, as opposed to the complete dataset. For example, it may be detrimental for a data analyst to start sharing charts that are based off sampled data with his or her colleagues or for a data scientist to start implementing predictive algorithms when data in both scenarios does not include the full dataset. However, the user might want to use the same analytics tool to get a feel of how the visualization would look with the real data.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 4 illustrates a graphical user interface (GUI) configured to enable a user to provide identification of a dataset and at least one configuration parameter, in accordance with some example embodiments;

FIG. 5 illustrates a GUI configured to enable a user to provide at least one wrangling parameter, in accordance with some example embodiments;

DETAILED DESCRIPTION

Figure 1:
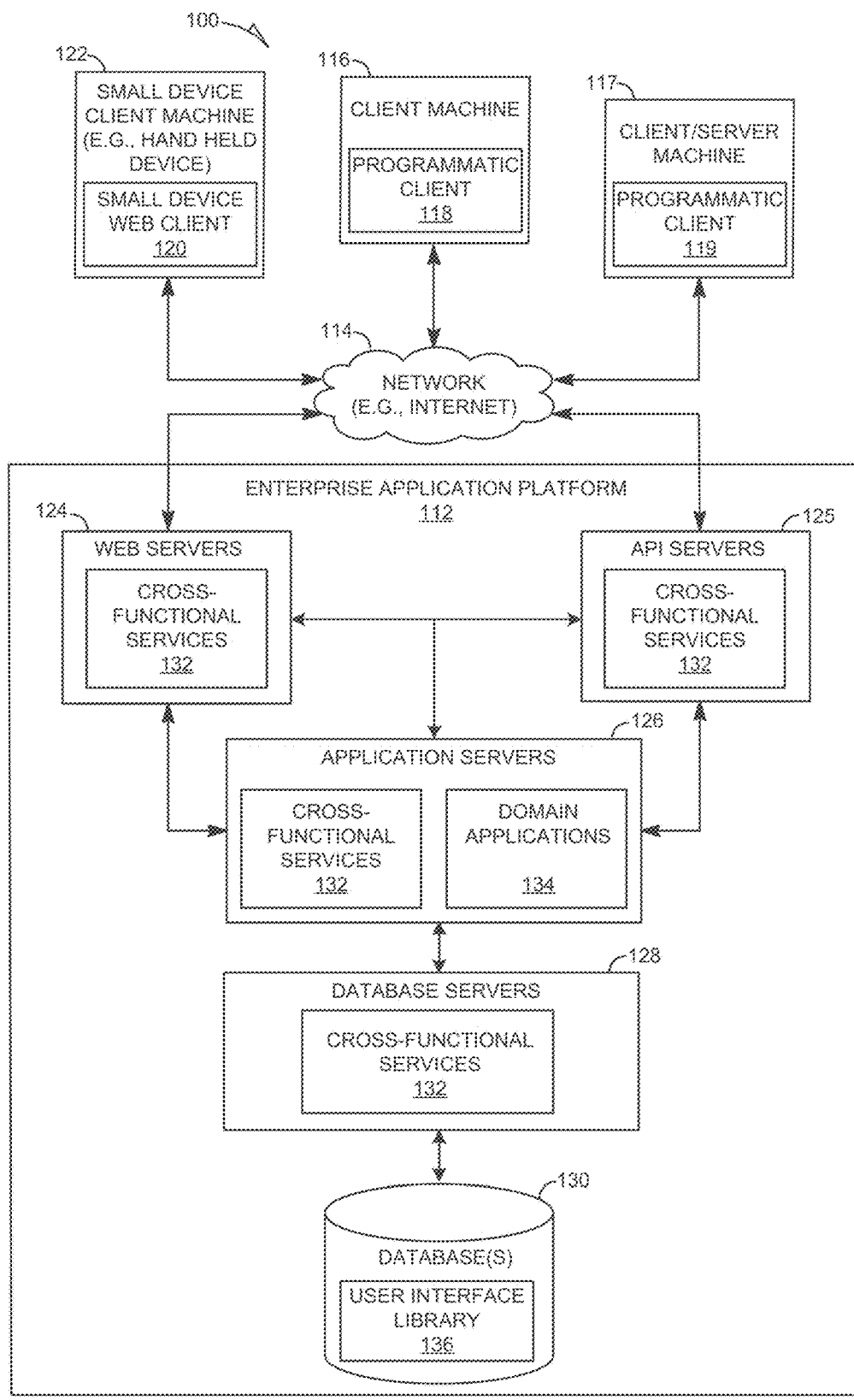
FIG. 1 is a network diagram illustrating a client-server system, in accordance with some example embodiments.

Example methods and systems of data wrangling are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides features that enable each user to configure his or her own sampling strategies for sampling data from a dataset. Since each user is the best judge of the dataset and task(s) that he or she is dealing with, as well as such issues as timing, enabling the user to configure a sampling algorithm provides the user with the ability to find the achieve the best balance of execution time versus quality of the sample. Additionally, the present disclosure provides features that indicate to users the quality of the sample that is being presented to them in a visualization of the sample.

In some example embodiments, a graphical user interface (GUI) is caused to be displayed on a computing device of a user. The GUI is configured to enable the user to submit an identification of a dataset, at least one configuration parameter, and at least one wrangling parameter. The identification of the data source, the configuration parameter(s), and the wrangling parameter are received via the GUI. A sampling algorithm is configured based on the configuration parameter(s). A sample of data from the dataset is generated using the configured sampling algorithm. At least one data wrangling operation is performed on the sample of data based on the wrangling parameter(s).

In some example embodiments, the configuring of the sampling algorithm is triggered in response to a user-generated interrupt corresponding to an input provided by the user via the GUI.

In some example embodiments, the configuring of the sampling algorithm comprises generating a query script based on the configuration parameter(s), with the query script being configured to sample data from the dataset in response to the query script being executed.

In some example embodiments, the configuration parameter(s) comprises any combination of one or more of a time parameter configured to limit an execution time of the generating the sample of data to within a maximum amount of time indicated by the user, a data amount parameter configured to limit a size of the sample to within a maximum number of data items indicated by the user, and a dataset percentage parameter configured to limit a size of the sample to within a maximum percentage of the dataset indicated by the user.

In some example embodiments, the generated sample of data is transmitted to a data visualization software tool configured to generate visual representations of data, a quality value of the sample of data is determined based on the configuration parameter(s), and the quality value is transmitted to the data visualization software tool. The data visualization software tool determines an original visualization of the sample of data, generates a modified visualization of the sample of data based on a modification of the original visualization, where the modification is based on the quality value, and causes the modified visualization of the sample to be displayed on the computing device of the user. In some example embodiments, determining the quality value comprises calculating an amount of the dataset that is included in the sample of data, and determining the quality value based on the calculated amount.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
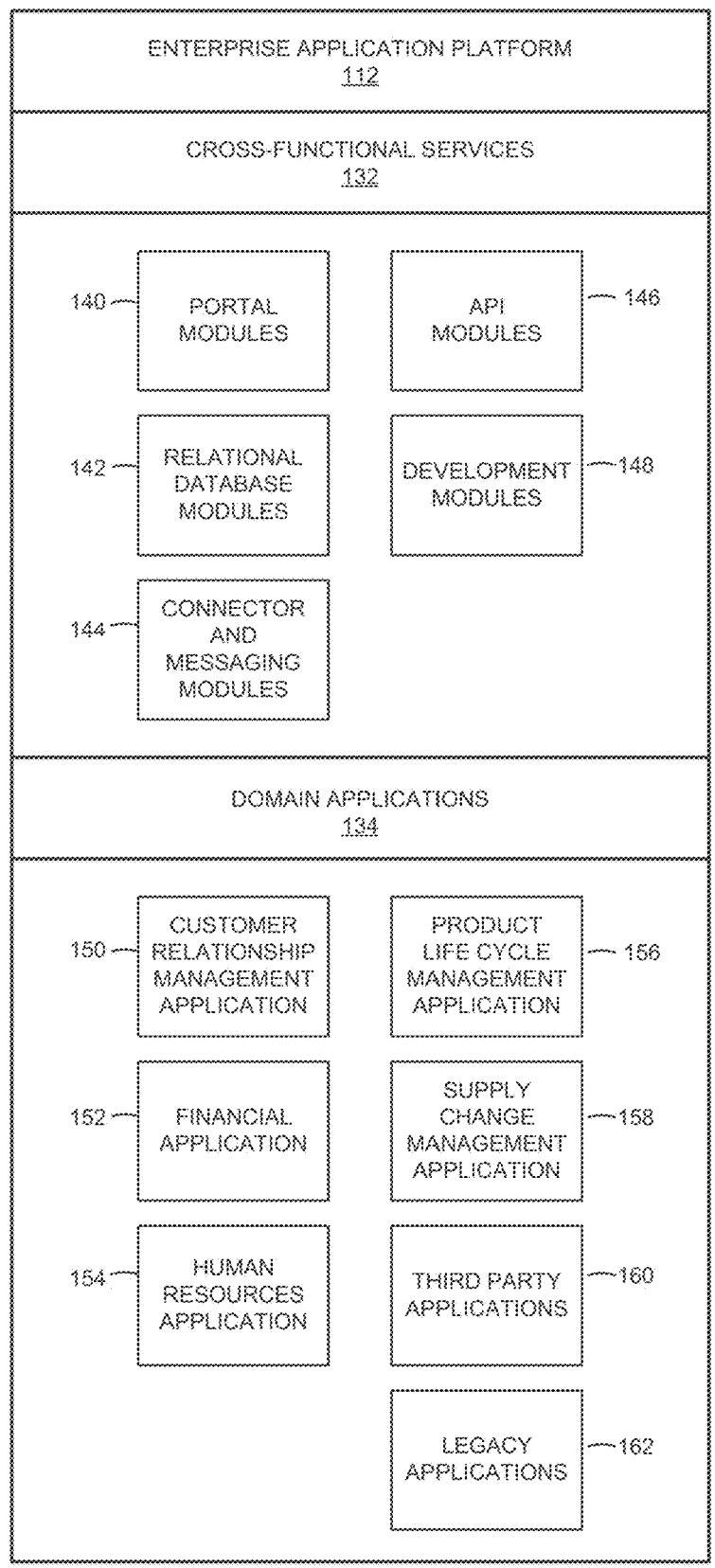
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle. MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
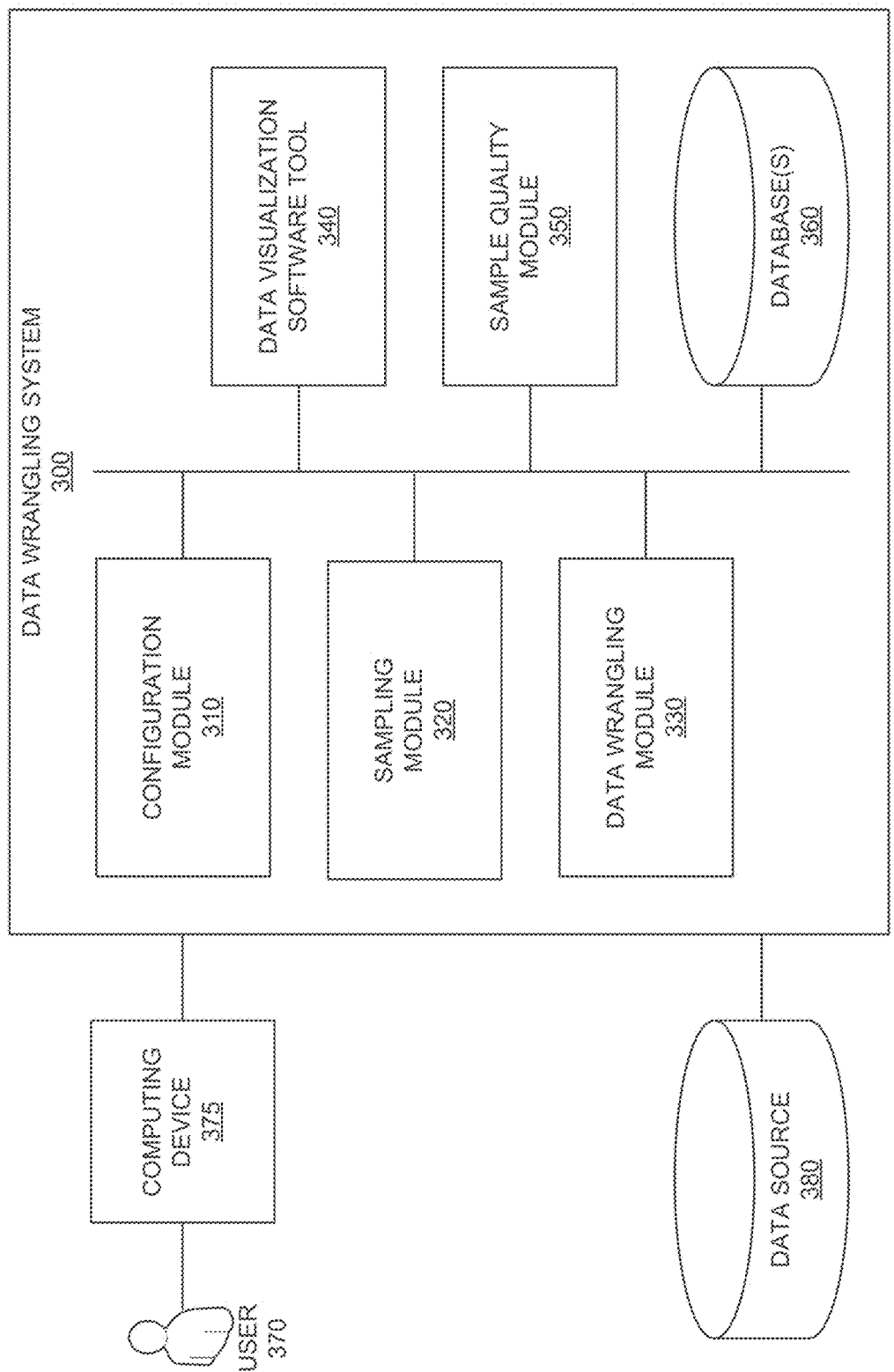
FIG. 3 is a block diagram illustrating a data wrangling system, in accordance with some example embodiments.

FIG. 3 is a block diagram illustrating components of a data wrangling system 300, in accordance with some example embodiments. In some example embodiments, the data wrangling system 300 comprises any combination of one or more of a configuration module 310, a sampling module 320, a data wrangling module 330, a data visualization software tool 340, a sample quality module 350, and one or more databases 360. The modules 310, 320, 330, 340, and 350 and the database(s) 360 can reside on a machine having a memory and at least one processor (not shown). In some example embodiments, the modules 310, 320, 330, 340, and 350 and the database(s) 360 reside on the same machine, while in other example embodiments, one or more of the modules 310, 320, 330, 340, and 350 and the database(s) 360 reside on separate remote machines that communicate with each other via a network (e.g., network 114 in FIG. 1). In some example embodiments, the modules 310, 320, 330, 340, and 350 and the database(s) 360 can be incorporated into the enterprise application platform 112 in FIG. 1 (e.g., on application server(s) 126). However, it is contemplated that other configurations are also within the scope of the present disclosure.

In some example embodiments, the configuration module 310 is configured to cause a graphical user interface (GUI) to be displayed on a computing device 375 of a user 370. Examples of the computing device 375 include, but are not limited to, a desktop computer, a laptop computer, a tablet computer, and a smartphone. The GUI can comprise and display different UI elements as different stages of user interaction (e.g., via different pages of the GUI being displayed to the user 370).

In some example embodiments, the GUI is configured to enable the user 370 to submit an identification of a dataset, at least one configuration parameter, and at least one wrangling parameter. FIG. 4 illustrates a GUI 400 configured to enable a user to provide an identification of a dataset 410 and at least one configuration parameter 420, in accordance with some example embodiments. The identification of the dataset 410 can identify a source of data from which a sample of data can be obtained. In some example embodiments, the dataset can reside in a data source (e.g., data source 380 in FIG. 3), which can comprise one or more databases. In some example embodiments, data source 380 resides on a different machine from the components of the data wrangling system 300 (e.g., modules 310, 320, 330, 340, and 350, and database(s) 360), external and remote from the machine(s) on which the components of the data wrangling system 300 reside. The dataset can comprise a single file, but can also comprise a directory of files. In some example embodiments, the user 370 can select the dataset 410 from a list of one or more datasets displayed via the GUI 400. Alternatively, the user 370 can enter the identification of the dataset 410 in a field displayed via the GUI 400. Other ways of enabling the user to provide the identification of the dataset 410 are also within the scope of the present disclosure.

The GUI 400 can enable the user to provide the configuration parameter(s) 420 by displaying one or more UI elements with which the user can interact, such as radio buttons and fields for entering the corresponding data for the configuration parameter(s) 420. The configuration parameter(s) can comprise any combination of one or more of a data amount parameter configured to limit a size of the sample to within a maximum number of data items indicated by the user (e.g., Fetch Maximum 900 Rows), a dataset percentage parameter configured to limit a size of the sample to within a maximum percentage of the dataset indicated by the user (e.g., Fetch 30% of Dataset), an order parameter configured to limit the sample to a specified order of the dataset (e.g., Fetch First 900 Rows), a randomization parameter configured to randomize the locations from which the data is sampled (e.g., Fetch 900 Random Rows), and a time parameter configured to limit an execution time of the generating the sample of data to within a maximum amount of time indicated by the user (e.g., Fetch for 10 Minutes). Other configuration parameters are also within the scope of the present disclosure. In some example embodiments, the GUI 400 can provide one or more recommended default configuration parameter(s) 420. For example, in FIG. 4, a default configuration parameter 420 of fetching the first 20,000 rows of the identified dataset can be preselected for the user 370. The user 370 can then change the configuration parameter(s) 420 at his or her discretion to suit his or her particular preference for the given situation.

FIG. 5 illustrates the GUI 400 configured to enable the user 370 to provide one or more wrangling parameters 510, in accordance with some example embodiments. The GUI 400 can enable the user to provide the wrangling parameter(s) 510 by displaying one or more UI elements with which the user can interact, such as radio buttons and fields for entering the corresponding data for the wrangling parameter(s) 510. The wrangling parameters(s) 510 can be configured to determine what data wrangling operations to perform on the sampled data. Such data wrangling operations can include, but are not limited to, cleaning unstructured raw data into a specified format, sorting or parsing the raw data into predefined data structures, forming one or more different dimensions and/or measures for the data, and merging data with metadata. Other data wrangling operations are also within the scope of the present disclosure.

Referring back to FIG. 3, in some example embodiments, the configuration module 310 is further configured to receive, via the GUI 400 on the computing device 375, the identification of the dataset 410 and the configuration parameter(s) 420, and to configure a sampling algorithm based on the configuration parameter(s) 420. The configuration module 310 can be configured to trigger the configuring of the sampling algorithm in response to a user-generated interrupt corresponding to an input provided by the user via the GUI 400, such as by the user selecting a "Submit" button to submit the identification of the dataset 410 and the configuration parameter(s) 420. In some example embodiments, the configuration module 310 is configured to configure a sampling algorithm by generating a query script based on the configuration parameter(s) 420. The query script can be configured to sample data from the dataset in response to the query script being executed.

In some example embodiments, the configuration module 310 is also configured to provide a framework that enables the user 370 to input his or her own sampling algorithm. For example the GUI 400 can provide the user 370 with one or more UI elements for inserting or uploading code for a sampling algorithm.

In some example embodiments, the sampling module 320 is configured to generate a sample of data from the dataset using the configured sampling algorithm. Accordingly, the user-provided configuration parameter(s) 420 can be used to determine what data from the dataset is sampled. The generated sample of data can then be stored in the database(s) 360 for later use, such as during data wrangling operations or data visualization operations.

In some example embodiments, the data wrangling module 330 is configured to perform at least one data wrangling operation on the sample of data based on the wrangling parameter(s) 510. As previously discussed, the data wrangling operation(s) can include, but are not limited to, cleaning unstructured raw data into a specified format, sorting or parsing the raw data into predefined data structures, forming one or more different dimensions and/or measures for the data, and merging data with metadata. In some example embodiments, filters and transformations can be applied to the raw data to create datasets, which may include sample data rows. Statistics can also be generated, which can include aspects such as how many rows are in the raw data, how large is the raw data, number of available dimensions or attributes, various statistical distributions, or any other relevant statistical measurement. Metadata comprising the dataset and the generated statistics can be utilized by users, such as user 370. Other data wrangling operations are also within the scope of the present disclosure.

In some example embodiments, the data visualization software tool 340 is configured to generate visual representations of data, such as the sampled data, which can be transmitted from the sampling module 320 to the data visualization software tool 340. The data visualization software tool 340 can comprise any software tool configured to generate visualizations of data. Visualizations can comprise graphical representations of data, such as charts, including measures and dimensions. A measure can be any property on which calculations (e.g., sum, count, average, minimum, maximum) can be made. A dimension can be a structure that categorizes or labels measures. Other types of visualizations are also within the scope of the present disclosure.

In the data wrangling phase, a visualization can be presented to the user 370 as a sample preview, so that the user 370 can experience what the visualization will look like before a long-running scheduled operation has finished. This feature can be implemented by the data wrangling module 330 and/or the data visualization software tool 340.

In some example embodiments, the sample quality module 350 is configured to determine a quality value of the sample of data based on the configuration parameter(s) 420. This quality value of the sample can be used by the data visualization software tool 340 to generate and display visualizations of sampled data, while at the same time indicating to the user 370 the fact that the visualization is based on a sample as opposed to the full dataset. This quality value can also be used by the data visualization software tool 340 to indicate to the user 370 the quality or confidence level of the sample, which can be based on how much of the full dataset the sample accounts for or otherwise represents, from where in the dataset the sample was obtained, and how the sample was obtained. Accordingly, the quality value can be determined based on the configuration parameter(s) 420, since the configuration parameters(s) 420 can influence all of these factors of the sample. Additionally, the quality value of the sample can also be based on a determination of the level of cardinality of the sample. For example, the sample quality module 350 can calculate, or otherwise determine, what portion (e.g., what percentage, what number) of the distinct values of the complete dataset are included in the sample. The higher the portion of distinct values of the dataset that the sample includes, the higher the quality value can be determined to be.

The sample quality module 350 can transmit the quality value to the data visualization software tool 340. The data visualization software tool 340 can be configured to determine an original visualization of the sample of data. This original visualization can be a clean version of the visualization (e.g., standard graphical representation of the sampled data with no added visual effects). The data visualization software tool 340 can generate a modified visualization of the sample of data based on a modification of the original visualization. This modification can comprise a visual effect being applied to the original visualization, such as a visual effect being applied to the datapoints of the original visualization. The modification can be based on the quality value In some example embodiments, the sample quality module 350 is configured to calculate an amount of the dataset that is included in the sample of data, and determine the quality value based on the calculated amount. The data visualization software tool 340 can cause the modified visualization of the sample to be displayed on the computing device 375 of the user 370.

Figure 6:
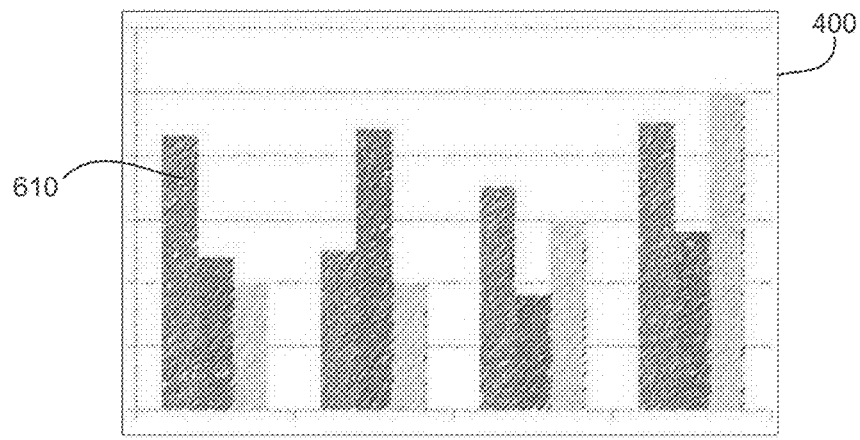
FIG. 6 illustrates a GUI displaying a visualization of a sample of data having a low quality value, in accordance with some example embodiments.

FIG. 6 illustrates a GUI 600 displaying a visualization 610 of a sample of data having a low quality value, in accordance with some example embodiments. In one example, the sample of data upon which the visualization 610 is based can comprise only 7% of the full dataset to which it corresponds. Based on the quality value being low, the data points in the visualization 610 are displayed as being greatly blurry or fuzzy, or otherwise of low picture quality. Other ways of visually representing the low quality value of the sample are also within the scope of the present disclosure.

Figure 7:
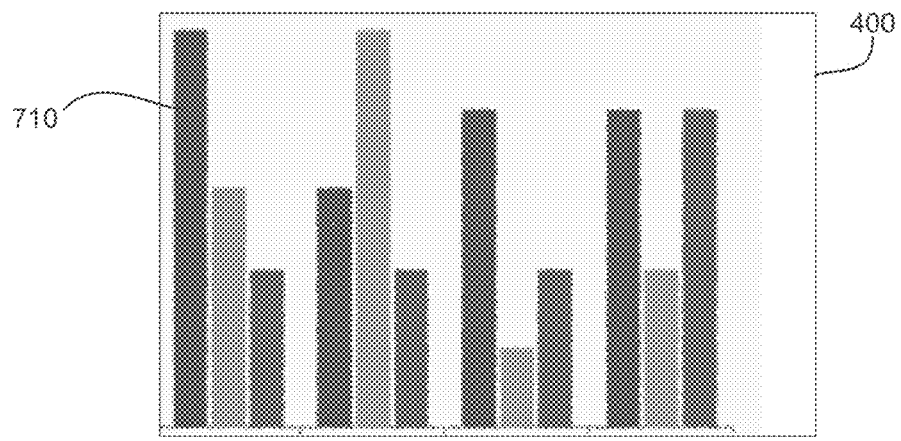
FIG. 7 illustrates a GUI displaying a sample of data having a medium quality value, in accordance with some example embodiments.

FIG. 7 illustrates a GUI 700 displaying a visualization 710 of a sample of data having a medium quality value, in accordance with some example embodiments. In one example, the sample of data upon which the visualization 610 is based can comprise 50% of the full dataset to which it corresponds. Based on the quality value being medium, the data points in the visualization 710 are displayed as being only slightly blurry or fuzzy, or otherwise of medium picture quality. Other ways of visually representing the medium quality value of the sample are also within the scope of the present disclosure.

Figure 8:
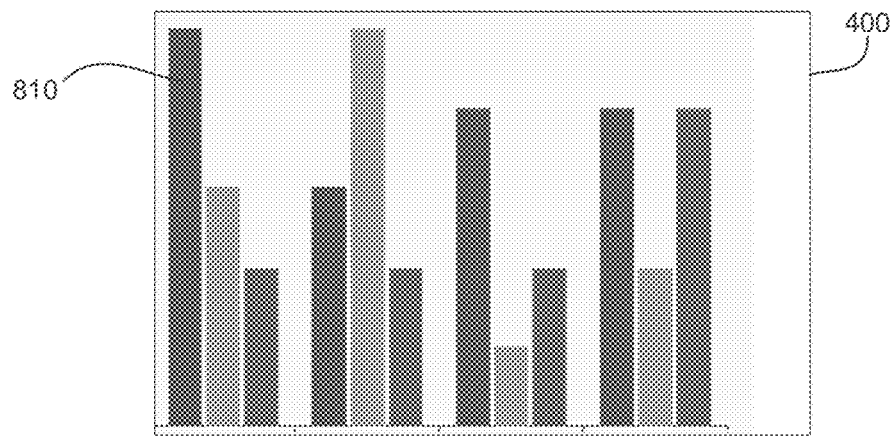
FIG. 8 illustrates a GUI displaying a sample of data having a high quality value, in accordance with some example embodiments.

FIG. 8 illustrates a GUI 800 displaying a visualization 810 of a sample of data having a high quality value, in accordance with some example embodiments. In one example, the sample of data upon which the visualization 610 is based can comprise only 96% of the full dataset to which it corresponds. Based on the quality value being high, the data points in the visualization 810 are displayed as not blurry or fuzzy at all, but rather clear and sharp, or otherwise of high picture quality. Other ways of visually representing the high quality value of the sample are also within the scope of the present disclosure.

Figure 9:
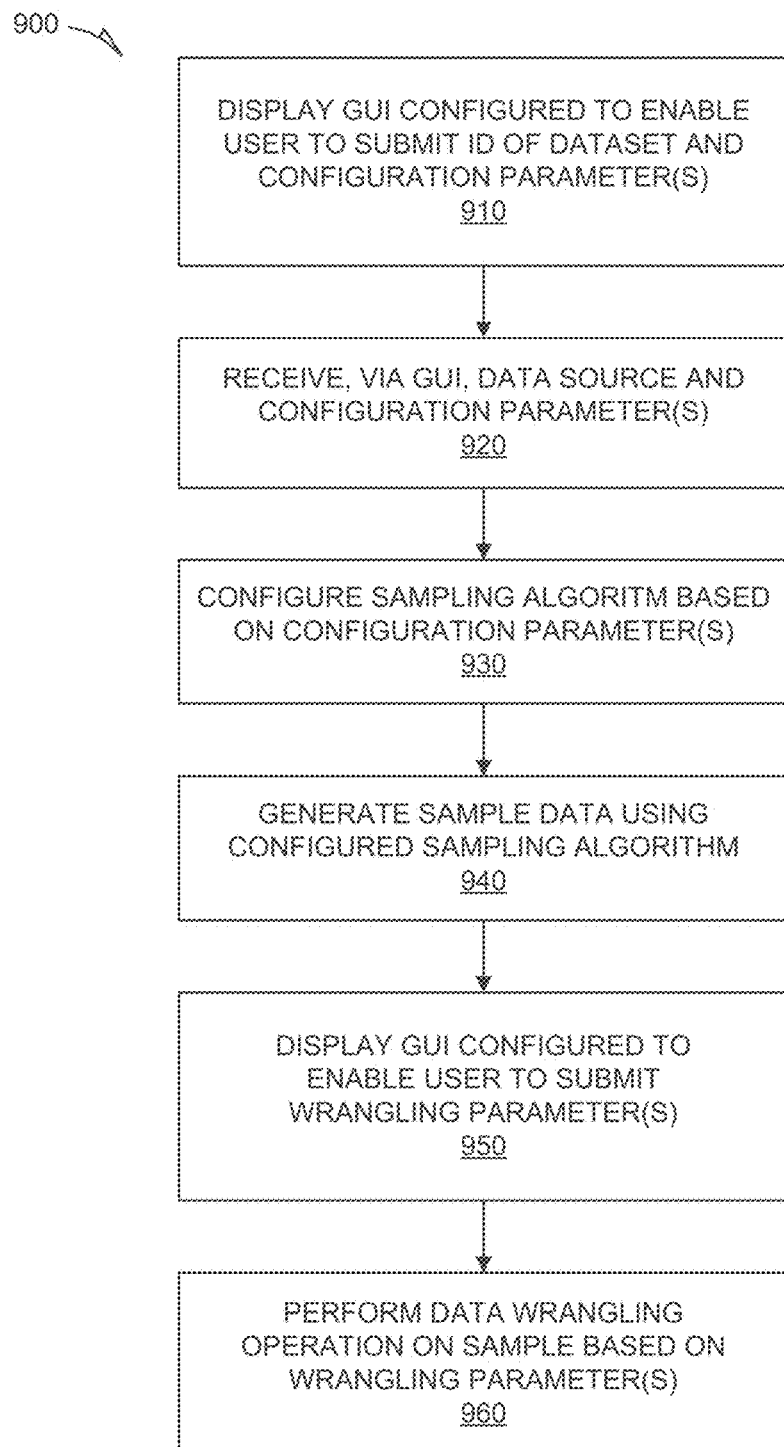
FIG. 9 is a flowchart illustrating a method of data wrangling, in accordance with some example embodiments.

FIG. 9 is a flowchart illustrating a method 900 of data wrangling, in accordance with some example embodiments. Method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the data wrangling system 300 of FIG. 3, or any combination of one or more of its components or modules, as described above.

At operation 910, a GUI can be caused to be displayed on a computing device of a user. The GUI can enable the user to submit an identification of a dataset and at least one configuration parameter. At operation 920, the identification of the data source, the configuration parameter(s), and the wrangling parameter can be received via the GUI. The configuration parameter(s) can comprise any combination of one or more of a time parameter configured to limit an execution time of the generating the sample of data to within a maximum amount of time indicated by the user, a data amount parameter configured to limit a size of the sample to within a maximum number of data items indicated by the user, and a dataset percentage parameter configured to limit a size of the sample to within a maximum percentage of the dataset indicated by the user. At operation 930, a sampling algorithm can be configured based on the configuration parameter(s). The configuring of the sampling algorithm can be triggered in response to a user-generated interrupt corresponding to an input provided by the user via the GUI. The configuring of the sampling algorithm can comprise generating a query script based on the at least one configuration parameter, with the query script being configured to sample data from the dataset in response to the query script being executed. At operation 940, a sample of data from the dataset can be generated using the configured sampling algorithm. At operation 950, the GUI can enable the user to submit at least one wrangling parameter. At operation 960, at least one data wrangling operation can be performed on the sample of data based on the wrangling parameter(s).

It is contemplated that any of the other features described within the present disclosure can be incorporated into method 900.

Figure 10:
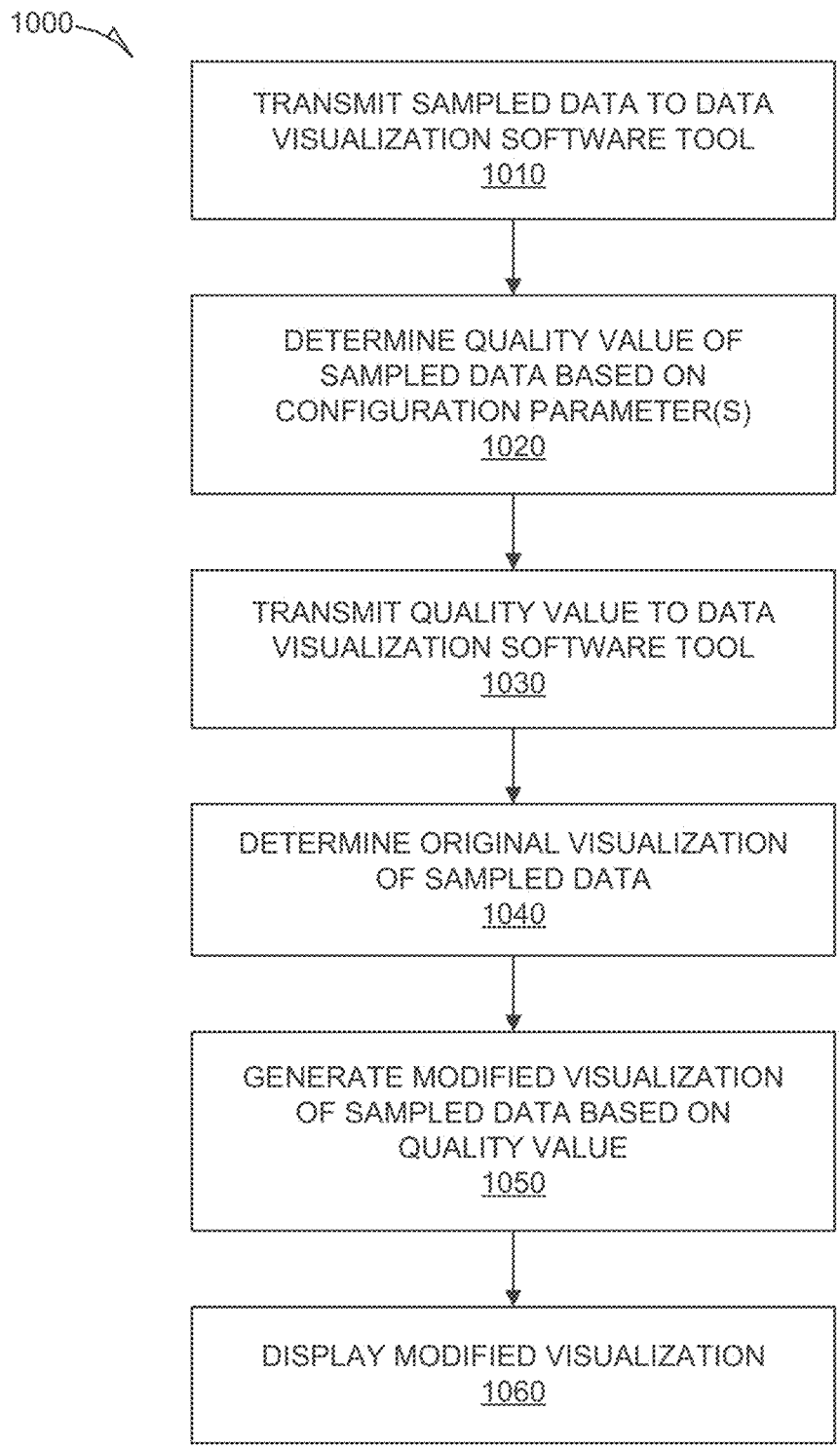
FIG. 10 is a flowchart illustrating a method of providing a visualization of sampled data, in accordance with some example embodiments.

FIG. 10 is a flowchart illustrating a method of providing a visualization of sampled data, in accordance with some example embodiments.

Method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the data wrangling system 300 of FIG. 3, or any combination of one or more of its components or modules, as described above.

At operation 1010, a generated sample of data can be transmitted to a data visualization software tool configured to generate visual representations of data. At operation 1020, a quality value of the sample of data can be determined based on the configuration parameter(s). Determining the quality value can comprise calculating an amount of the dataset that is included in the sample of data, and determining the quality value based on the calculated amount. At operation 1030, the quality value can be transmitted to the data visualization software tool. At operation 1040, the data visualization software tool can determine an original visualization of the sample of data. At operation 1050, the data visualization software tool can generate a modified visualization of the sample of data based on a modification of the original visualization. The modification can be based on the quality value. At operation 1060, the data visualization software tool can cause the modified visualization of the sample to be displayed on the computing device of the user.

It is contemplated that any of the other features described within the present disclosure can be incorporated into method 1000.

Example Mobile Device

Figure 11:
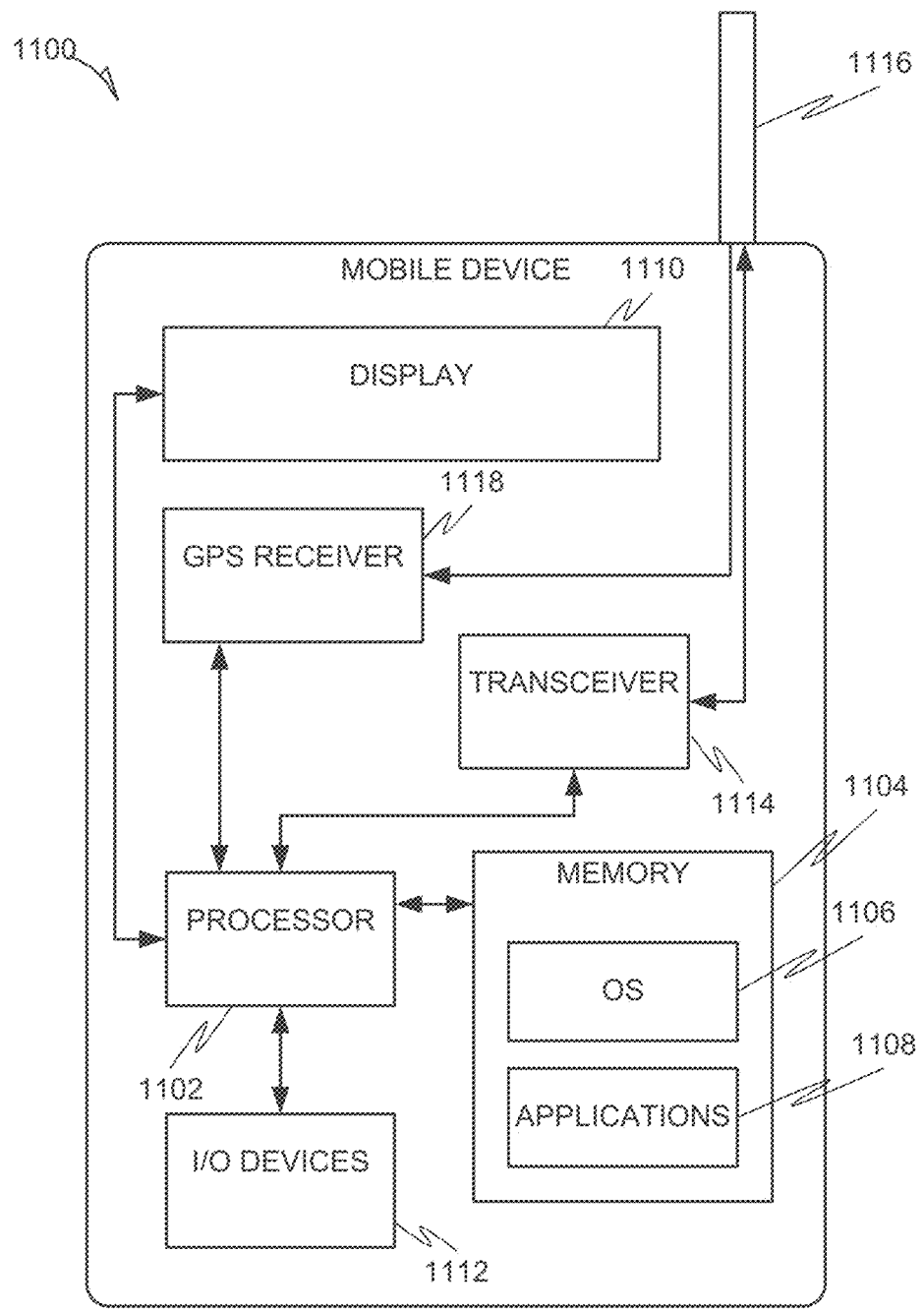
FIG. 11 is a block diagram illustrating a mobile device, in accordance with some example embodiments.

FIG. 11 is a block diagram illustrating a mobile device 1100, according to some example embodiments. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor) A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location enabled application that can provide LBSs to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some example embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 12:
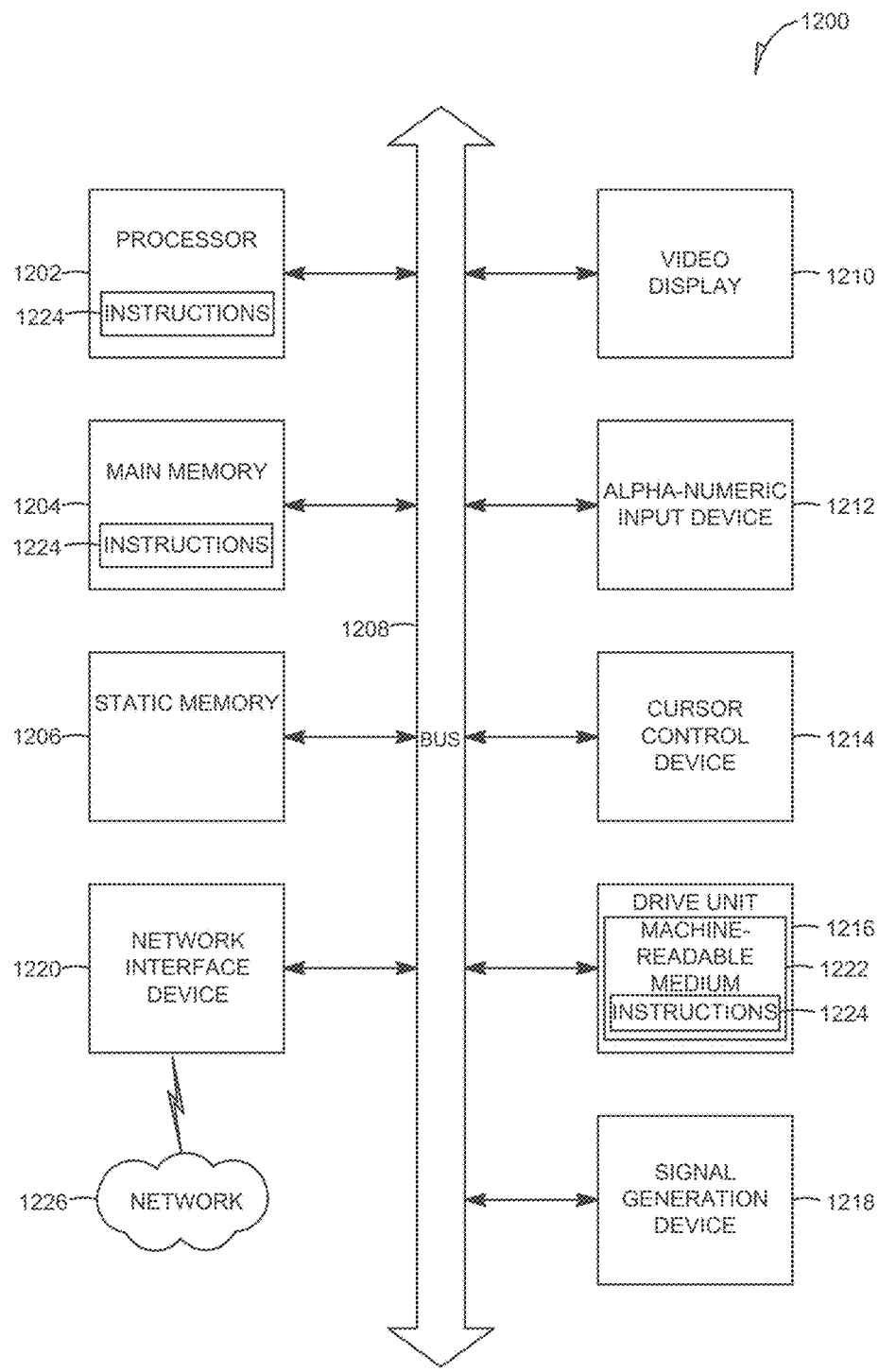
FIG. 12 is a block diagram of an example computer system on which methodologies described herein can be executed, in accordance with some example embodiments.

FIG. 12 is a block diagram of a machine in the example form of a computer system 1200 within which instructions 1224 for causing the machine to perform any one or more of the methodologies discussed herein can be executed, in accordance with some example embodiments. In alternative embodiments, the machine operates as a standalone device or can be connected (e.g., networked) to other machines In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 can further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204 and/or within the processor 1202 during execution thereof by the computer system 1200, the main memory 1204 and the processor 1202 also constituting machine-readable media. The instructions 1224 can also reside, completely or at least partially, within the static memory 1206.

While the machine-readable medium 1222 is shown in an example embodiment to be a single medium, the term "machine-readable medium" can include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 can further be transmitted or received over a communications network 1226 using a transmission medium. The instructions 1224 can be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
at least one processor; and
a non-transitory computer-readable medium storing executable instructions that, when executed, cause the at least one processor to perform operations comprising:
receiving an identification of a dataset and at least one configuration parameter submitted by a user via a graphical user interface (GUI) on a computing device of the user;
configuring a sampling algorithm based on the at least one configuration parameter; and
generating a sample of data from the dataset using the configured sampling algorithm, the time parameter limiting an execution time of the generating the sample of data to within a maximum amount of time indicated by the user.

2. The system of claim 1, wherein the operations further comprise triggering the configuring the sampling algorithm in response to a user-generated interrupt corresponding to an input provided by the user via the GUI.

3. The system of claim 1, wherein the configuring the sampling algorithm comprises generating a query script based on the at least one configuration parameter, the query script being configured to sample data from the dataset in response to the query script being executed.

4. The system of claim 1, wherein the at least one configuration parameter further comprises a data amount parameter configured to limit a size of the sample to within a maximum number of data items indicated by the user.

5. The system of claim 1, wherein the at least one configuration parameter further comprises a dataset percentage parameter configured to limit a size of the sample to within a maximum percentage of the dataset indicated by the user.

6. The system of claim 1, wherein the operations further comprise transmitting the generated sample of data to a data visualization software tool configured to generate visual representations of data.

7. The system of claim 6, wherein the operations further comprise:
   determining a quality value of the sample of data based on the at least one configuration parameter;
   transmitting the quality value to the data visualization software tool;
   determining, by the data visualization software tool, an original visualization of the sample of data;
   generating, by the data visualization software tool, a modified visualization of the sample of data based on a modification of the original visualization, the modification being based on the quality value; and
   causing, by the data visualization software tool, the modified visualization of the sample to be displayed on the computing device of the user.

8. The system of claim 7, wherein the determining the quality value comprises:
   calculating an amount of the dataset that is included in the sample of data; and
   determining the quality value based on the calculated amount.

9. A computer-implemented method comprising:
   receiving, by at least one hardware processor, an identification of a dataset and at least one configuration parameter submitted by a user via a graphical user interface (GUI) on a computing device of the user;
   configuring, by the at least one hardware processor, a sampling algorithm based on the at least one configuration parameter; and
   generating, by the at least one hardware processor, a sample of data from the dataset using the configured sampling algorithm, the time parameter limiting an execution time of the generating the sample of data to within a maximum amount of time indicated by the user.

10. The computer-implemented method of claim 9, further comprising triggering the configuring the sampling algorithm in response to a user-generated interrupt corresponding to an input provided by the user via the GUI.

11. The computer-implemented method of claim 9, wherein the configuring the sampling algorithm comprises generating a query script based on the at least one configuration parameter, the query script being configured to sample data from the dataset in response to the query script being executed.

12. The computer-implemented method of claim 9, wherein the at least one configuration parameter further comprises a data amount parameter configured to limit a size of the sample to within a maximum number of data items indicated by the user.

13. The computer-implemented method of claim 9, wherein the at least one configuration parameter further comprises a dataset percentage parameter configured to limit a size of the sample to within a maximum percentage of the dataset indicated by the user.

14. The computer-implemented method of claim 9, further comprising transmitting the generated sample of data to a data visualization software tool configured to generate visual representations of data.

15. The computer-implemented method of claim 14, further comprising:
   determining a quality value of the sample of data based on the at least one configuration parameter;
   transmitting the quality value to the data visualization software tool;
   determining, by the data visualization software tool, an original visualization of the sample of data;
   generating, by the data visualization software tool, a modified visualization of the sample of data based on a modification of the original visualization, the modification being based on the quality value; and
   causing, by the data visualization software tool, the modified visualization of the sample to be displayed on the computing device of the user.

16. The computer-implemented method of claim 15, wherein the determining the quality value comprises:
   calculating an amount of the dataset that is included in the sample of data; and
   determining the quality value based on the calculated amount.

17. A non-transitory machine-readable storage medium, tangibly embodying a set of instructions that, when executed by at least one processor, causes the at least one processor to perform operations comprising:
   receiving an identification of a dataset and at least one configuration parameter submitted by a user via a graphical user interface (GUI) on a computing device of the user;
   configuring a sampling algorithm based on the at least one configuration parameter; and
   generating a sample of data from the dataset using the configured sampling algorithm, the time parameter limiting an execution time of the generating the sample of data to within a maximum amount of time indicated by the user.

18. The non-transitory machine-readable storage medium of claim 17, wherein the operations further comprise triggering the configuring the sampling algorithm in response to a user-generated interrupt corresponding to an input provided by the user via the GUI.

19. The non-transitory machine-readable storage medium of claim 17, wherein the configuring the sampling algorithm comprises generating a query script based on the at least one configuration parameter, the query script being configured to sample data from the dataset in response to the query script being executed.

20. The non-transitory machine-readable storage medium of claim 17, wherein the at least one configuration parameter further comprises a data amount parameter configured to limit a size of the sample to within a maximum number of data items indicated by the user.

\* \* \* \* \*